US010042414B2

United States Patent
Ou et al.

(10) Patent No.: US 10,042,414 B2
(45) Date of Patent: Aug. 7, 2018

(54) CONCURRENT NETWORK APPLICATION SCHEDULING FOR REDUCED POWER CONSUMPTION

(71) Applicant: Intel Corporation, Santa Clara, CA (US)

(72) Inventors: Zhongghong Ou, Hillsboro, OR (US); Ren Wang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,783

(22) PCT Filed: Oct. 1, 2013

(86) PCT No.: PCT/US2013/062805
§ 371 (c)(1),
(2) Date: Dec. 27, 2013

(87) PCT Pub. No.: WO2015/050525
PCT Pub. Date: Apr. 9, 2015

(65) Prior Publication Data
US 2016/0252945 A1 Sep. 1, 2016

(51) Int. Cl.
*G06F 1/26* (2006.01)
*G06F 1/32* (2006.01)
(Continued)

(52) U.S. Cl.
CPC .......... *G06F 1/329* (2013.01); *G06F 1/3209* (2013.01); *G06F 1/3228* (2013.01);
(Continued)

(58) Field of Classification Search
CPC . H04W 52/0264; H04W 4/003; H04W 52/02; H04W 52/0258; H04W 48/06;
(Continued)

(56) References Cited

U.S. PATENT DOCUMENTS

| 8,190,088 B1 * | 5/2012 | Keshav | H04W 56/00 455/41.1 |
| 8,966,493 B1 * | 2/2015 | Richards | G06F 9/4887 718/104 |

(Continued)

FOREIGN PATENT DOCUMENTS

JP   2013503557 A   1/2013

OTHER PUBLICATIONS

Kravets et al., "Application-Driven Power Management for Mobile Communication", Wireless Networks 6, 2000, pp. 263-277.
(Continued)

*Primary Examiner* — Thomas Lee
*Assistant Examiner* — Zhipeng Wang
(74) *Attorney, Agent, or Firm* — Barnes & Thornburg LLP

(57) ABSTRACT

Technologies for scheduling network requests to reduce power consumption include a mobile computing device configured to receive a network request from a network application, and determine whether the network request is delayable, based on execution constraints of the application. Execution constraints may include required processing resources, acceptable latency, priority, application class, and others. If the request is delayable, the mobile computing device may delay the request until a threshold number of delayable requests are received, or until a non-delayable request is received. The mobile computing device performs the delayed request and any subsequently received requests concurrently. The execution constraints may be supplied by each network application, or may be determined by the mobile computing device through observation. Other embodiments are described and claimed.

22 Claims, 6 Drawing Sheets

(51) Int. Cl.
*H04W 52/02* (2009.01)
*G06F 9/48* (2006.01)

(52) U.S. Cl.
CPC ...... *G06F 9/4893* (2013.01); *H04W 52/0216* (2013.01); *Y02D 10/24* (2018.01); *Y02D 70/00* (2018.01); *Y02D 70/1262* (2018.01); *Y02D 70/142* (2018.01); *Y02D 70/144* (2018.01); *Y02D 70/146* (2018.01); *Y02D 70/23* (2018.01)

(58) Field of Classification Search
CPC .. H04W 52/0216; G06F 1/3206; G06F 1/329; G06F 2209/542; G06F 9/4887; G06F 9/4893
See application file for complete search history.

(56) References Cited

U.S. PATENT DOCUMENTS

| | | | |
|---|---|---|---|
| 2002/0163933 A1* | 11/2002 | Benveniste | H04L 47/10 370/465 |
| 2004/0083478 A1 | 4/2004 | Chen et al. | |
| 2007/0028228 A1* | 2/2007 | Battista | G06F 8/65 717/168 |
| 2007/0286222 A1* | 12/2007 | Balasubramanian | H04L 12/12 370/412 |
| 2008/0141265 A1 | 6/2008 | Choi | |
| 2009/0307696 A1 | 12/2009 | Vals et al. | |
| 2011/0047552 A1* | 2/2011 | Mergen | G06F 9/4893 718/102 |
| 2012/0096287 A1 | 4/2012 | Kamath et al. | |
| 2012/0124196 A1* | 5/2012 | Brisebois | H04W 76/046 709/224 |
| 2012/0185577 A1* | 7/2012 | Giaretta | H04W 4/003 709/223 |
| 2012/0210325 A1* | 8/2012 | de Lind van Wijngaarden | H04W 52/0258 718/103 |
| 2012/0214527 A1* | 8/2012 | Meylan | H04L 69/32 455/509 |
| 2013/0219400 A1 | 8/2013 | Mergen et al. | |
| 2014/0293848 A1* | 10/2014 | Varney | H04W 52/0251 370/311 |

OTHER PUBLICATIONS

Lago et al., "An Application-Aware Approach to Efficient Power Management in Mobile Devices", Jun. 16-19, 2009, 10 pages.
Moghimi et al., "Context-Aware Mobile Power Management Using Fuzzy Inference as a Service", vol. 110, 2013, 14 pages.
International Search Report and Written Opinion received for PCT Patent Application No. PCT/US2013/062805, dated Jul. 24, 2014, 12 pages.
Qualcomm, "Managing Background Data Traffic in Mobile Devices", Qualcomm Incorporated, Jan. 2012, 16 pages.
Extended European Search Report in European Patent Application No. 13895108.2, dated May 22, 2017 (8 pages).
Office Action and English Translation for Japanese Patent Application No. 2016-536072, dated Mar. 22, 2017, 24 pages.
European Search Report for Application No. 13895108.2-1879/3053033, dated May 22, 2017, 8 pages.
Korean Office Action for Patent Application No. 10-2016-7005528, dated Dec. 18, 2017, 6 pages.

* cited by examiner

CONCURRENT NETWORK APPLICATION SCHEDULING FOR REDUCED POWER CONSUMPTION

CROSS REFERENCE TO RELATED APPLICATIONS

This application is a national stage entry under 35 USC § 371(b) of International Application No. PCT/US2013/062805, which was filed Oct. 1, 2013.

BACKGROUND

Portable computing devices such as smartphones, tablet, and notebook computers connected to fast wireless networks have greatly increased the use of bandwidth-intensive network applications. Most portable devices have many network-intensive applications available, including media streaming, video chat, interactive messaging, and cloud data storage applications. However, portable computing devices typically have a limited battery capacity. Increased use of portable computing devices, and in particular increased use of wireless network radios, increases power consumption of the portable device and thus reduces usable battery life.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
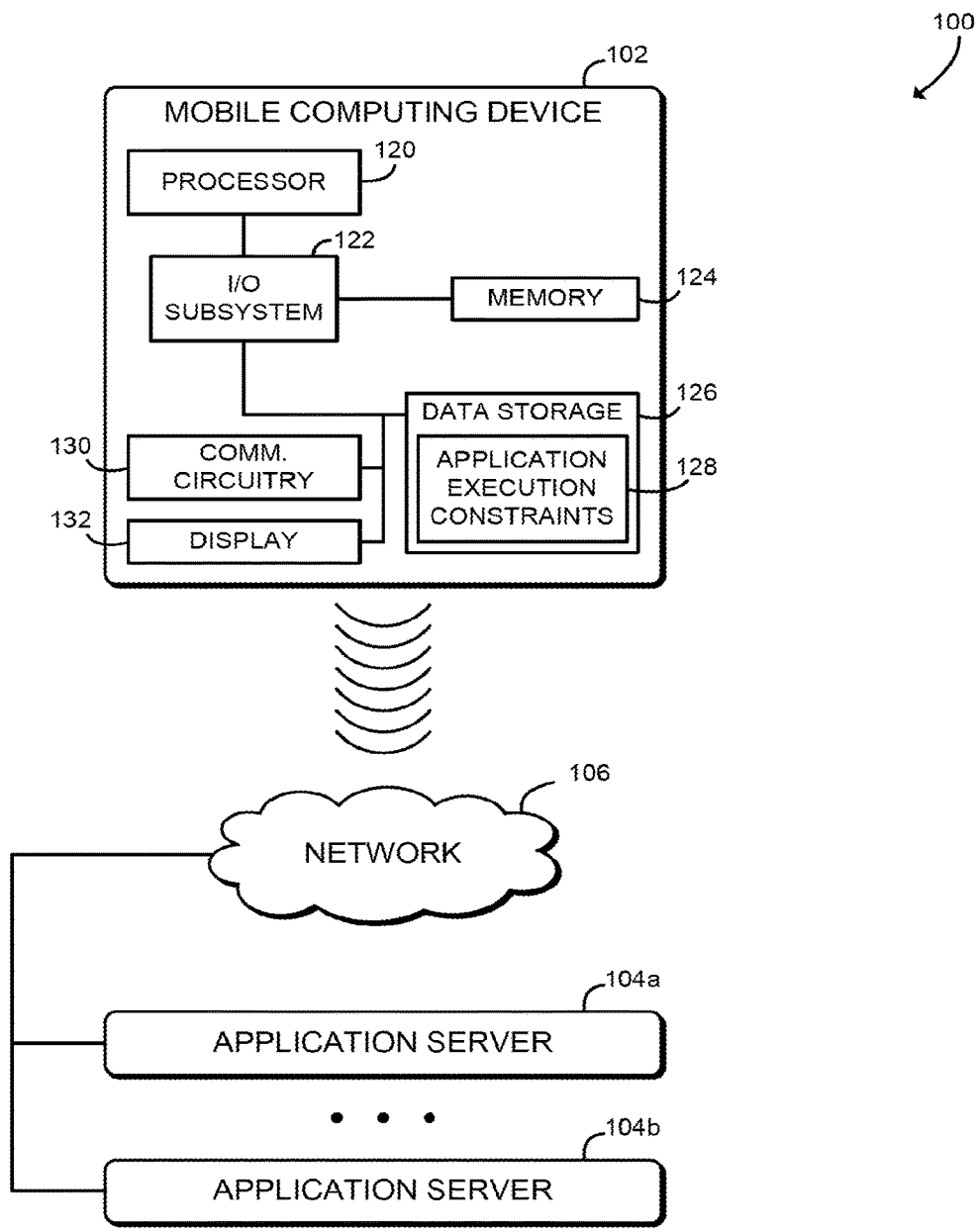
FIG. 1 is a simplified block diagram of at least one embodiment of a system for concurrent network application scheduling.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for concurrent network application scheduling includes a mobile computing device 102 and one or more application servers 104. The mobile computing device 102 and the application servers 104 may be in communication with each other over a network 106. In use, as discussed in more detail below, the mobile computing device 102 executes a number of network applications that communicate with the application servers 104. The mobile computing device 102 receives a number of network requests from the applications, and determines whether the requests may be delayed without adversely affecting the network application or use thereof. The mobile computing device 102 delays requests, if possible, until they can be executed concurrently with another delayable request or with a non-delayable request. For example, the mobile computing device 102 may execute the delayed application(s) with another delayed or non-delayed application such that at least a portion of the execution of each network application overlaps or otherwise occurs contemporaneously with each other. In some embodiments, the mobile computing device 102 may schedule the concurrently-executed applications to start at the same time or otherwise contemporaneously with each other, and the applications may be executed in a parallel or interleaved manner (e.g., each concurrently-executed application may access a network interface or other hardware of the mobile computing device 102 in an interleaved manner). In such embodiments, it should be understood that the execution of the network applications may complete at different times. In other embodiments, a delayed application may be concurrently executed with another application by initiating the execution of the delayed application sometime after the initiation of execution of the other application.

For example, in some embodiments, a first network application may issue a request to connect with the application server 104*a*. The mobile computing device 102 may delay the request to connect with the application server 104*a* until a request from another application to connect to the application server 104*b* is received. In that example, the mobile computing device 102 services the requests to connect to the applications servers 104*a*, 104*b* concurrently.

Concurrent network application scheduling may reduce power consumption of the mobile computing device 102 when compared to servicing network requests sequentially or individually. Additionally, for many wireless networks 106, the performance of each network application may not be adversely affected by concurrent execution. In particular, when the application servers 104 throttle or otherwise limit their bandwidth usage with respect to available bandwidth—which is typical for many media streaming applications—overall performance, and user experience, may be unchanged by concurrent network execution.

The mobile computing device 102 may be embodied as any type of device capable of performing the functions described herein, including, without limitation, a smartphone, a cellular telephone, a handset, a computer, a tablet computer, a laptop computer, a notebook computer, a messaging device, a vehicle telematics device, a network appliance, a web appliance, a distributed computing system, a multiprocessor system, a processor-based system, and/or a consumer electronic device. As shown in FIG. 1, the mobile computing device 102 includes a processor 120, an input/output subsystem 122, a memory 124, a data storage device 126, and communication circuitry 130. Of course, the mobile computing device 102 may include other or additional components, such as those commonly found in a smartphone (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the mobile computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the mobile computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the mobile computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store one or more application execution constraints 128 used to define network, processing, and other resource requirements of various network applications installed and/or executed on the mobile computing device 102. As discussed in more detail below, the mobile computing device 102 may make determination of whether execution of an application is delayable based on one or more application execution constraints associated with the particular application.

The communication circuitry 130 of the mobile computing device 102 may be embodied as any communication circuit, device, or collection thereof, capable of enabling communications between the mobile computing device 102, the application servers 104, and/or other remote devices over the network 106. The communication circuitry 130 may be configured to use any one or more communication technology (e.g., wireless or wired communications) and associated protocols (e.g., 3G, LTE, Bluetooth®, Wi-Fi®, WiMAX, etc.) to effect such communication. The illustrative communication circuitry 130 communicates with the network 106 using wireless communications; however, it should be understood that this disclosure is equally applicable to wired network connections (e.g. Ethernet).

In the illustrative embodiment, the mobile computing device 102 further includes a display 132. The display 132 of the mobile computing device 102 may be embodied as any type of display capable of displaying digital information such as a liquid crystal display (LCD), a light emitting diode (LED), a plasma display, a cathode ray tube (CRT), or other type of display device. In some embodiments, the display 132 may be coupled to a touch screen to allow user interaction with the mobile computing device 102.

Each of the application servers 104 is configured to provide network services to one or more applications of the mobile computing device 102. For example, an application server 104 may provide telephony services (e.g. VoIP services), video services, web services, email, cloud data services, or any other network service. For example, in the illustrative embodiment, the application server 104*a* may provide web services, and the application server 104*b* may provide VoIP services. Each application server 104 may be embodied as any type of server computing device, or collection of devices, capable of performing the functions described herein. As such, each application server 104 may be embodied as a single server computing device or a collection of servers and associated devices. For example, in some embodiments, each application server 104 may be embodied as a "virtual server" formed from multiple computing devices distributed across the network 106 and operating in a public or private cloud. Accordingly, although the application server(s) 104 are illustrated in FIG. 1 as embodied as a single server computing device, it should be appreciated that each application server 104 may be embodied as multiple devices cooperating together to facilitate the functionality described below. Further, each application server 104 may include components and features similar to the mobile computing device 102 and/or typical data servers such as a processor, I/O subsystem, memory, data storage, communication circuitry, and various peripheral devices, which are not illustrated in FIG. 1 for clarity of the present description.

As discussed in more detail below, the mobile computing device 102 and the application server(s) 104 may be configured to transmit and receive data with each other and/or other devices of the system 100 over the network 106. The network 106 may be embodied as any number of various wired and/or wireless networks. For example, the network 106 may be embodied as, or otherwise include, a wired or wireless local area network (LAN), a wired or wireless wide area network (WAN), a cellular network, and/or a publicly-accessible, global network such as the Internet. As such, the network 106 may include any number of additional devices, such as additional computers, routers, and switches, to facilitate communications among the devices of the system 100.

Figure 2:
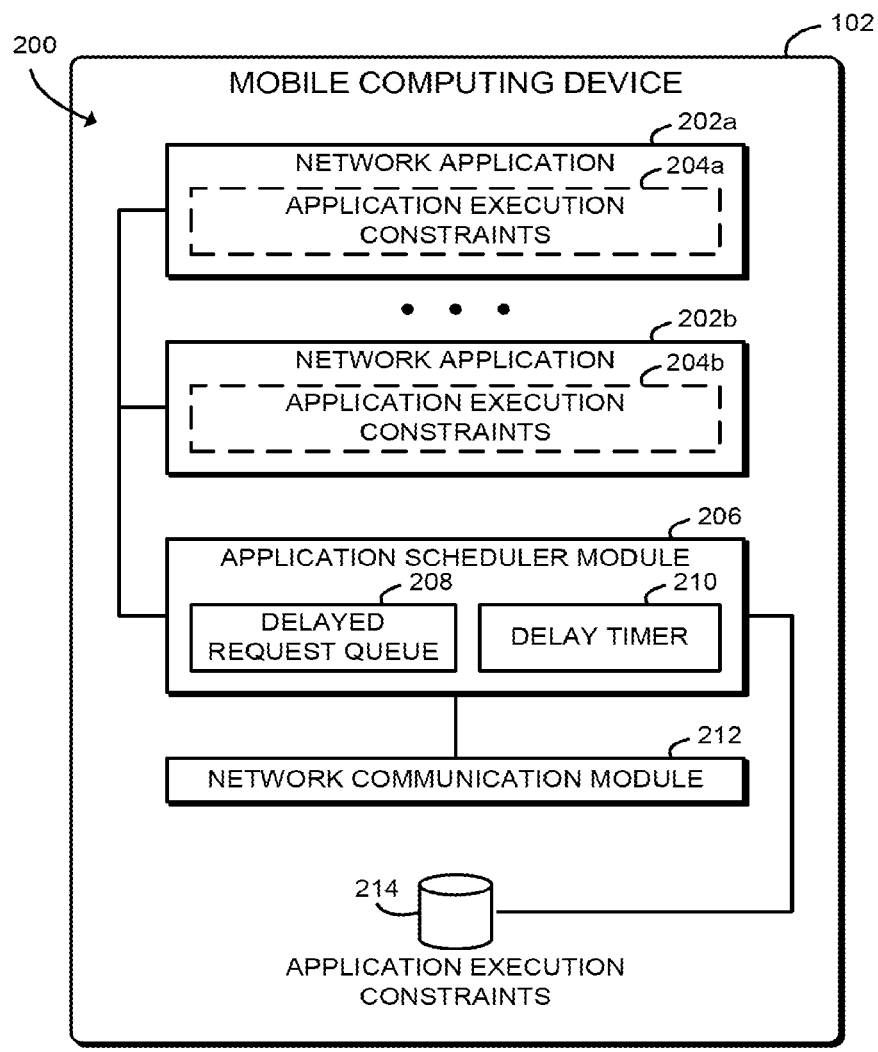
FIG. 2 is a simplified block diagram of at least one embodiment of an environment that may be established by a mobile computing device of FIG. 1.

Referring now to FIG. 2, in the illustrative embodiment, the mobile computing device 102 establishes an environment 200 during operation. The environment 200 includes a number of network applications 202, an application scheduler module 206, and a network communication module 212. The environment 200 further includes application execution constraints 214. The various modules of the environment 200 may be embodied as hardware, firmware, software, or a combination thereof.

The network applications 202 may each be embodied as any application that accesses services provided by one or more of the application servers 104. Each of the network applications 202 is configured to submit network requests to the application scheduler module 206 prior to accessing the application servers 104. Additionally or alternatively, the application scheduler module 206 may be configured to "trap" network accesses by the applications 202. In some embodiments, each network application 202 may submit associated application execution constraints 204 to the application scheduler module 206, either at the time of submitting a network request or at an earlier time, such as during installation of the application 202. Those application execution constraints 204 may be stored in the application execution constraints 214 established in the environment 200, as described below. Although the applications 202 are illustrated and described as network applications, it should be understood that this disclosure may be equally applicable to any kind of application executable on the mobile computing device 102.

The application scheduler module 206 is configured to receive network requests from the network applications 202 and schedule each network request for immediate or delayed execution. The application scheduler module 206 determines whether to schedule network requests for delayed execution based on the application execution constraints 214 associated with the network application 202. As described below, a network request may be delayable based on the acceptable latency, priority, application class, or any other execution constraint of the application 202. The application scheduler module 206 is further configured to schedule network requests for concurrent execution to reduce total power consumption. To manage request scheduling, the application scheduler module 206 may maintain a queue of network requests scheduled for delayed execution, and may maintain a timer to ensure requests are executed within their allowed parameters. In some embodiments, those functions may be performed by sub-modules, for example by a delayed request queue 208 or a delay timer 210.

The network communication module 212 is configured to execute, or otherwise facilitate, the network requests that have been scheduled for execution by the application scheduler module 206. Executing the network requests may include opening network connections, sending and receiving data, and any other processing required by the network application 202. The network communication module 212 may activate the appropriate application 202 to perform the network request, may execute a task, thread, or process supplied by the application 202 to perform the network request, or may independently perform the network request.

The application execution constraints 214 define the resource requirements, time limits, and/or other parameters that are required by the network applications 202 for acceptable performance and/or user experience. As described further below, the application execution constraints 214 may describe the network resources, processing resources, required timing, or urgency of the network applications 202. In some embodiments, the application execution constraints 214 may be supplied by each network application 202. For example, the developer of each network application 202 may supply constraints that are installed into the application execution constraints 214 when the application 202 is installed. Additionally or alternatively, the mobile computing device 102 may determine the application execution constraints 214 by monitoring the behavior of the network applications 202 in use, over time. The application execution constraints 214 may be stored in any data format, for example as a local database.

Figure 3:
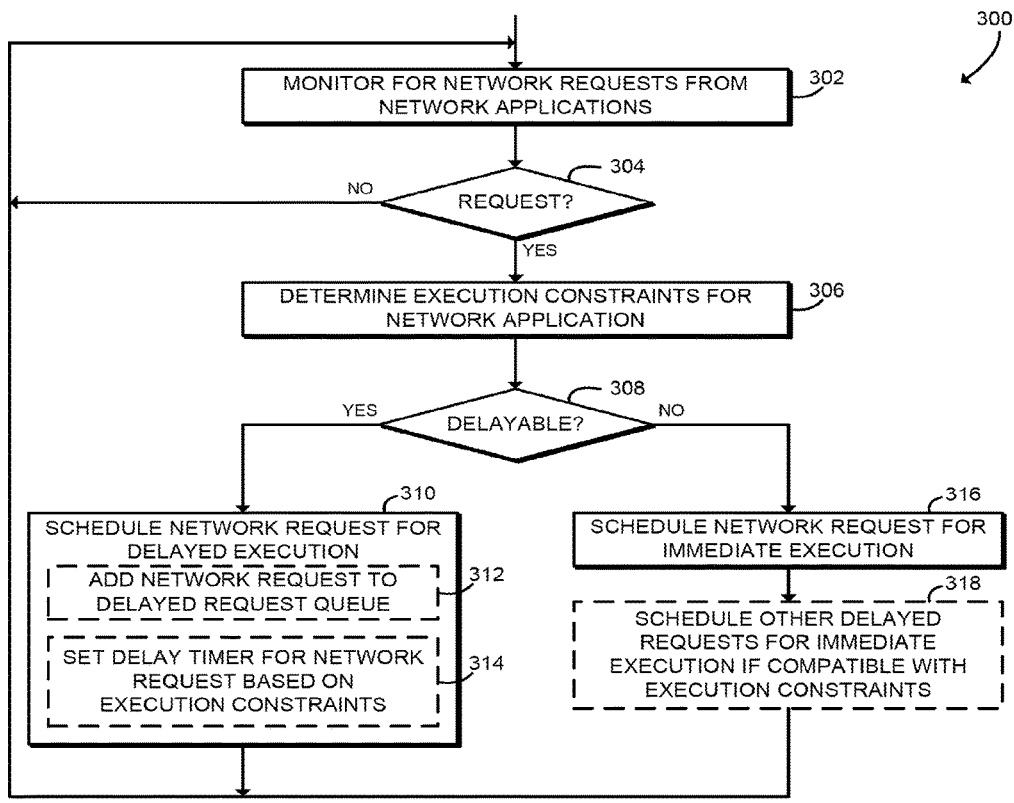
FIG. 3 is a simplified flow diagram of at least one embodiment of a method for scheduling network requests that may be executed by a mobile computing device of the system of FIGS. 1 and 2.

Referring now to FIG. 3, in use, the mobile computing device 102 may execute a method 300 for network application scheduling. The method 300 begins with block 302, in which the mobile computing device 102 monitors for network requests. A network request may be embodied as any request to send or receive network data between a network application 202 and one or more applications servers 104, at any level of abstraction. The network applications 202 may submit network requests using a standardized application programming interface ("API"). For example, the network request may be embodied as a request to open a TCP connection to an application server 104, or as a request to download a file from a particular internet address. In block 304, the mobile computing device 102 determines whether a network request has been received. If no request has been received, the method 300 loops back to block 302 to continue monitoring for network requests. If a network request has been received, then the method 300 advances to block 306.

In block 306, the mobile computing device 102 determines one or more application execution constraints 214 for the network application 202 making the network request. In some embodiments, the mobile computing device 102 may retrieve the application execution constraints 214 from a database of constraints that have previously been established on the mobile computing device 102. Additionally or alternatively, in some embodiments the mobile computing device 102 may receive the application execution constraints 214 directly from the application 202, for example through a standardized API.

In block 308, the mobile computing device 102 determines whether the network request is delayable based on the application execution constraints 214. In other words, the mobile computing device 102 determines whether the request may be delayed without adversely affecting the performance or user experience of the application 202. For example, in some embodiments, network requests may be delayable for low-priority applications 202, or for applications 202 capable of tolerating large amounts of network latency. Conversely, in some embodiments, network requests may not be delayable for high-priority applications 202, low-latency applications 202, or for applications 202 requiring large amounts of processing resources. One embodiment of a method for determining whether a request is delayable is described below in connection with FIG. 5. If the network request is not delayable, the method 300 branches to block 316, described further below. If the network request is delayable, the method 300 branches to block 310.

In block 310, the mobile computing device 102 schedules the network request for delayed execution. As described below in connection with FIG. 4, delaying execution of the network request may allow the mobile computing device 102 to opportunistically schedule the network request for execution at a later time to achieve reduced power consumption. The mobile computing device 102 may use any available technique for scheduling the network request for delayed execution. For example, the mobile computing device 102 may cause a process, task, or thread of the application 202 to pause, suspend, block, or otherwise yield execution. Additionally or alternatively, the application 202 may continue execution, but a separate network request task, process, or thread may be suspended. In some embodiments, in block 312 the mobile computing device 102 may add the network request to the delayed request queue 208. Thus, by storing multiple network requests in the delayed request queue 208, the mobile computing device 102 may schedule more than one network request for delayed execution.

In some embodiments, in block 314 the mobile computing device 102 may set the delay timer 210 for the network request, based on the application execution constraints 214 of the application 202. As further described below, setting the delay timer 210 may allow the mobile computing device 102 to ensure that the network request is executed within a desired time period. For example, the mobile computing device 102 may set the delay timer 210 to the maximum allowable latency specified in the application execution constraints 214. Continuing that example, the delay timer 210 may be set to ten minutes for an email updating application 202, or to twenty-four hours for a backup application 202, for example. After scheduling the network request for delayed execution, the method 300 loops back to block 302 to await further network requests.

Referring back to block 308, if the network request is not delayable, the method 300 branches to block 316. In block 316, the mobile computing device 102 schedules the network request for immediate execution. The mobile computing device 102 may use any available technique for scheduling the network request for immediate execution. For example, the mobile computing device 102 may start execution of a process, task, or thread to service the network request. Additionally or alternatively, the mobile computing device 102 may open and return a requested network connection to the requesting application 202, or submit the application 202 to an operating system process scheduler or run queue (not shown).

In some embodiments, in block 318 the mobile computing device 102 may schedule other delayed network requests for immediate execution upon determination that the current network request has been scheduled for immediate execution. For example, the mobile computing device 102 may start any delayed network request contained in the delayed request queue 208. Once started, the previously delayed requests run concurrently with the request started in block 316. Thus, any previously delayed network requests may "piggyback" execution with a later-arriving request that is executed immediately. Prior to starting any other delayed request, the mobile computing device 102 may determine if concurrent execution is compatible with the application execution constraints 214 of the current application 202. For example, concurrent execution may not be compatible with a current application 202 requiring a large amount of processing resources (e.g. if the current application 202 saturates the processor 120). After scheduling the network request(s) for immediate execution, the method 300 loops back to block 302 to monitor for additional network requests.

Figure 4:
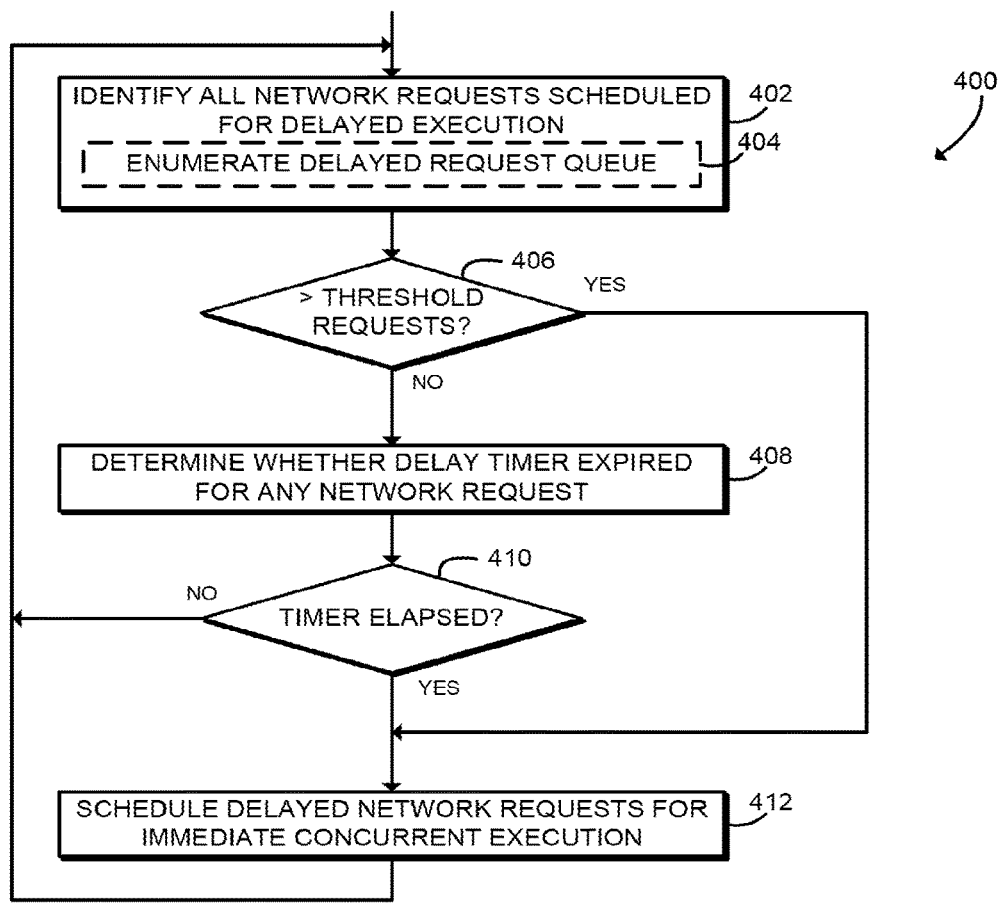
FIG. 4 is a simplified flow diagram of at least one embodiment of a method for concurrently executing network requests that may be executed by the mobile computing device of FIGS. 1 and 2.

Referring now to FIG. 4, in use, the mobile computing device 102 may execute a method 400 for concurrently executing network requests. Although illustrated as a separate method, the method 400 may be executed concurrently with the method 300 for scheduling network requests or otherwise be coordinated with the method 300. The method 400 begins in block 402, in which the mobile computing device 102 identifies all network requests that have previously been scheduled for delayed execution. In some embodiments, in block 404 the mobile computing device 102 may enumerate all delayed network requests contained in the delayed request queue 208. As described above in connection with FIG. 3, network requests may have been added to the delayed request queue 208 after being received from the network applications 202 by the mobile computing device 102.

In block 406, the mobile computing device 102 determines whether the number of delayed network requests exceeds a threshold number of requests. In some embodiments, the threshold number of requests may simply be one request; that is, the mobile computing device 102 may determine whether there is currently more than one network request scheduled for delayed execution. Of course, in other embodiments the threshold number of requests may be higher, such as two requests or three requests. If the number of requests exceeds the threshold, the method 400 branches ahead to block 412, as described below. If the number of requests does not exceed the threshold, the method 400 advances to block 408.

In block 408, the mobile computing device 102 determines whether the delay timer 210 has elapsed for any network request. In other words, the mobile computing device 102 may determine whether the acceptable latency has been exceeded (or is about to be exceeded) for any of the delayed network requests. The mobile computing device 102 may use any technique for determining whether the delay timer 210 has elapsed. For example, the mobile computing device 102 may iterate through all of the delayed network requests of the delayed request queue 208 to determine whether the delay timer 210 has elapsed. Additionally or alternatively, the mobile computing device 102 may determine whether the delay timer 210 has elapsed asynchronously, for example by capturing events fired by the delay timer 210 (not shown).

In block 410, the mobile computing device 102 determines whether to branch if the delay timer 210 has elapsed. If the timer has not elapsed, the method 400 loops back to block 402 to continue identifying delayed network requests. Thus, in that circumstance, delayed network requests may remain in the delayed request queue 208 until sufficient delayed network requests are received, or until the maximum latency of any network request is exceeded. If the delay timer 210 has elapsed, the method 400 advances to block 412.

In block 412, the mobile computing device 102 schedules the delayed network requests for immediate, concurrent execution. The mobile computing device 102 may execute every network request contained in the delayed request queue 208, and may empty the queue when finished. The mobile computing device 102 may use any available technique for scheduling the network requests for immediate execution. For example, the mobile computing device 102 may start execution of a process, task, or thread to service each network request. In some embodiments, the mobile computing device 102 may open and return a requested network connection to each requesting application 202, or submit each application 202 to an operating system process scheduler or run queue (not shown). All of the network requests are scheduled to execute concurrently. After scheduling the network requests, the method 400 loops back to block 402 to continue identifying delayed network requests.

Figure 5:
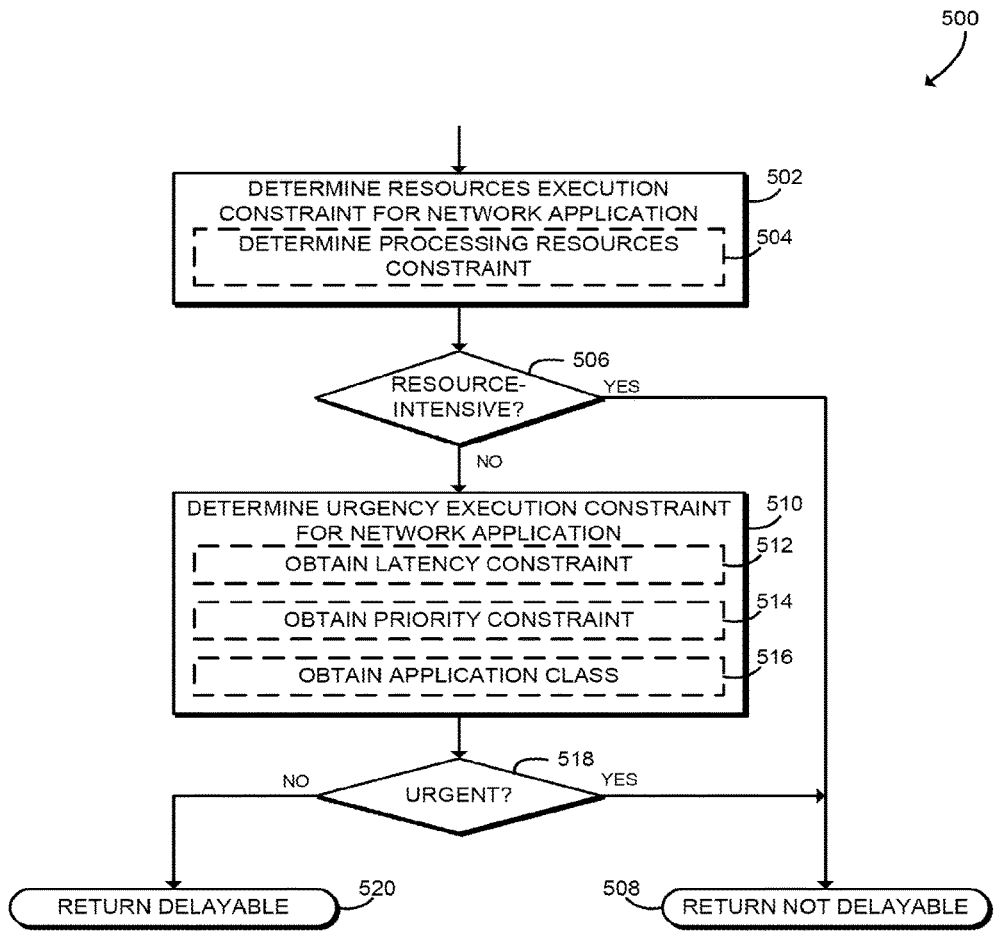
FIG. 5 is a simplified flow diagram of at least one embodiment of a method for determining whether a network request is delayable that may be executed by the mobile computing device of FIGS. 1 and 2.

Referring now to FIG. 5, in use, the mobile computing device 102 may execute a method 500 for determining whether a network request is delayable. The method 500 may be executed, for example, as a part of the block 308 as described above in connection with FIG. 3. The method 500 begins in block 502, in which the mobile computing device 102 determines a resources execution constraint of the application execution constraints 214 associated with the current application 202. The resources execution constraint defines resources of the mobile computing device 102 required by the application 202 to complete the network request. For example, the resources execution constraint may describe required memory, data storage, or processor resources. In some embodiments, in block 504, the mobile computing device 102 determines a processing resources constraint for the application 202. The processing resources constraint may describe a number of processors, processor cores, processor cycles, or other processing resources of the mobile computing device 102 required by the application 202. For example, the resources execution constraint may describe the percentage of available processing resources that the application 202 anticipates it will require. In some embodiments, the resources execution constraint may simply identify the application 202 as having "high" or "low" processing requirements.

In block 506, the mobile computing device 102 determines whether the application 202 is resource-intensive. In other words, the mobile computing device 102 determines whether the resources execution constraint exceeds a threshold resource requirement. For example, the mobile computing device 102 may determine whether the application 202 will use all available processor cycles, or whether the application 202 has been labeled as having "high" processing requirements. If the application 202 is resource-intensive, the method 500 branches to block 508, in which the method 500 returns that the application 202 is not delayable. As described above in connection with FIG. 3, if the application 202 is not delayable, the network request may be scheduled for immediate execution. Referring back to block 506, if the application 202 is not resource-intensive, the method 500 advances to block 510.

In block 510, the mobile computing device 102 determines an urgency execution constraint of the application execution constraints 214 associated with the current application 202. The urgency constraint defines the tolerance of the application 202 to time delays. In some embodiments, in block 512 the mobile computing device 102 obtains a latency constraint. The latency constraint describes the allowable network latency for the current application 202, and may be measured in terms of elapsed time. For example, a daily backup application 202 may have allowed latency of several hours, an email application 202 may have allowed latency of several minutes, and a real-time telephony application 202 may have no allowed latency. In some embodiments, in block 514 the mobile computing device 102 may obtain a priority constraint. The priority constraint describes the relative importance of the application 202. For example, system applications 202 or user-initiated interactive applications 202 may have high priority, while background applications 202 may have low priority. In some embodiments, in block 516 the mobile computing device 102 may obtain an application class for the application 202. The application class may describe the general network usage patterns of the application 202; for example, application classes may include real-time communication applications, interactive applications, or background applications. The application class may be predetermined for each application 202, or may be assigned by the mobile computing device 102 based on observations of the application 202 in use.

In block 518, the mobile computing device 102 determines whether the current network request is urgent. The mobile computing device 102 may determine whether the previously determined urgency execution constraint exceeds a threshold urgency level. The mobile computing device 102 may use any of the possible measures of urgency. For example, the mobile computing device 102 may determine that the request is urgent if the allowed latency is below a threshold latency. In some embodiments, a request may be urgent if it requires no allowable latency. As another example, the mobile computing device 102 may determine that the request is urgent if the priority level exceeds a threshold priority level. As a third example, the mobile computing device 102 may determine that the request is urgent if the application class belongs to a predefined set of urgent applications classes, such as real-time communication applications or interactive applications. Additionally, the mobile computing device 102 may determine that the request is urgent based on an input or indication provided by the user (e.g., an indication that the application should have high priority access). If the request is urgent, the method 500 branches to block 508 to return not delayable, as described above. If the request is not urgent, the method 500 branches to block 520, in which the method 500 returns that the application 202 is delayable. As described above in connection with FIG. 3, if the application 202 is delayable, the network request may be scheduled for delayed execution.

Figure 6:
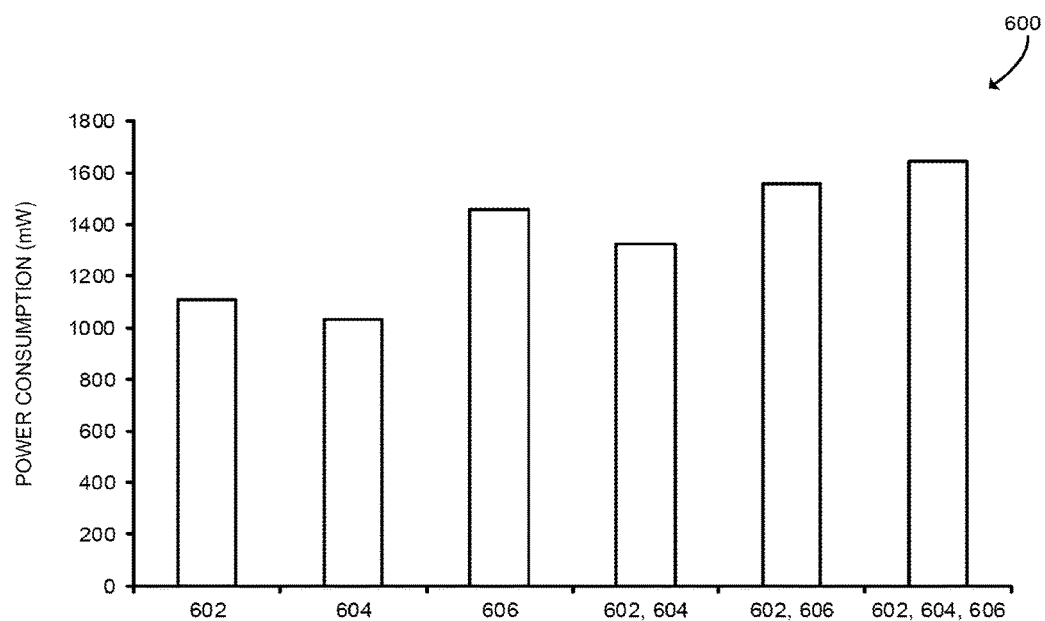
FIG. 6 is a chart showing illustrative results that may be achieved by the mobile computing device of FIGS. 1 and 2.

Referring now to FIG. 6, a chart 600 shows illustrative results that may be achieved by a mobile computing device according to the present disclosure. It should be appreciated that the results presented in chart 600 are merely illustrative and other results may be produced in other embodiments. The chart 600 illustrates measured power consumption of a mobile computing device while executing different application workloads separately and concurrently. In the illustrative representation, the application 602 is a VoIP application (i.e. an application that cannot be scheduled for delayed execution). Executed separately, application 602 consumes, for example, 1108 mW of power. The illustrative application 604 is a file download from a web server and consumes, for example, 1033 mW of power when executed separately. The illustrative application 606 is a file upload to a web server and consumes, for example, 1460 mW of power when executed separately. Executed concurrently, applications 602, 604 illustratively consume 1324 mW of power, a 38% improvement in power consumption compared to separate execution. Applications 602, 606 illustratively consume 1555 mW of power when executed concurrently, a 39% improvement in power consumption compared to separate execution. And, applications 602, 604, 606 illustratively consume 1643 mW of power when executed concurrently, a 54% improvement in power consumption compared to separate execution.

Although the present disclosure has been primarily described in terms of network applications 202, it should be understood that the same scheduling techniques may reduce power consumption for other types of applications. Similarly, although the present disclosure has primarily been described in terms of a mobile computing device 102 communicating over a wireless network 106, it should be understood that the same scheduling techniques may reduce power consumption for stationary or primarily stationary computers such as desktops and servers, as well as for communications over wired networks.

EXAMPLES

Illustrative examples of the technologies disclosed herein are provided below. An embodiment of the technologies may include any one or more, and any combination of, the examples described below.

Example 1 includes a mobile computing device for scheduling applications, the mobile computing device comprising an application scheduler module to: receive a first network request from a first network application of the mobile computing device; determine one or more first execution constraints for the first network application; determine whether the first network request is delayable based on the one or more first execution constraints; schedule the first network request for delayed execution in response to a determination that the first network request is delayable; receive a second network request from a second network application of the mobile computing device; and schedule the first network request and the second network request for concurrent execution in response to receipt of the second network request.

Example 2 includes the subject matter of Example 1, and wherein to determine the one or more first execution constraints comprises to determine an urgency level of the first network application based on the one or more first execution constraints; and to determine whether the first network request is delayable comprises to determine whether the urgency level is less than a threshold urgency level.

Example 3 includes the subject matter of any of Examples 1 and 2, and wherein the urgency level comprises a priority of the first network application, and the threshold urgency level comprises a threshold priority.

Example 4 includes the subject matter of any of Examples 1-3, and wherein the urgency level comprises an application class of the first network application; and to determine whether the urgency level is less than the threshold urgency level comprises to determine whether the application class belongs to a predefined set of urgent application classes.

Example 5 includes the subject matter of any of Examples 1-4, and wherein the urgency level comprises an acceptable latency of the first network application; and to determine whether the urgency level is less than the threshold urgency level comprises to determine whether the acceptable latency exceeds a threshold latency.

Example 6 includes the subject matter of any of Examples 1-5, and wherein to schedule the first network request for delayed execution comprises to set a delay timer based on the acceptable latency of the first network application; wherein the application scheduler module is further to determine whether the delay timer has elapsed; and wherein to execute the first network request and the second network request comprises to execute the first network request and the second network request concurrently in response to a determination that the delay timer has elapsed.

Example 7 includes the subject matter of any of Examples 1-6, and wherein to determine the one or more first execution constraints comprises to determine a resource requirement of the first network application based on the one or more first execution constraints; and to determine whether the first network request is delayable comprises to determine whether the resource requirement is less than a threshold resource requirement.

Example 8 includes the subject matter of any of Examples 1-7, and wherein the resource requirement comprises a processor requirement of the first network application, and the threshold resource requirement comprises a threshold processor requirement.

Example 9 includes the subject matter of any of Examples 1-8, and wherein the application scheduler module is further to: determine one or more second execution constraints for the second network application; determine whether the second network request is delayable based on the one or more second execution constraints; schedule the second network request for delayed execution in response to a determination the second network request is delayable; and determine, in response to a scheduling of the second network request, whether more than a threshold number of network requests have been scheduled for delayed execution; wherein to execute the first network request and the second network request comprises to execute the first network request and the second network request in response to a determination that more than the threshold number of network requests have been scheduled for delayed execution.

Example 10 includes the subject matter of any of Examples 1-9, and wherein the application scheduler module is further to: determine one or more second execution constraints for the second network application; determine whether the second network request is delayable based on the one or more second execution constraints; and schedule the second network request for immediate execution in response to a determination that the second network request is not delayable; wherein to execute the first network request and the second network request comprises to execute the first network request and the second network request concurrently in response to a scheduling of the second network request for immediate execution.

Example 11 includes the subject matter of any of Examples 1-10, and wherein to determine the one or more second execution constraints comprises to determine an urgency level of the second network application based on the one or more second execution constraints; and to determine whether the second network request is delayable comprises to determine whether the urgency level is less than a threshold urgency level.

Example 12 includes the subject matter of any of Examples 1-11, and wherein the urgency level comprises a priority of the second network application, and the threshold urgency level comprises a threshold priority.

Example 13 includes the subject matter of any of Examples 1-12, and wherein the urgency level comprises an application class of the second network application; and to determine whether the urgency level is less than the threshold urgency level comprises to determine whether the application class belongs to a predefined set of urgent application classes.

Example 14 includes the subject matter of any of Examples 1-13, and wherein the urgency level comprises an acceptable latency of the second network application; and to determine whether the urgency level is less than the threshold urgency level comprises to determine whether the acceptable latency exceeds a threshold latency.

Example 15 includes the subject matter of any of Examples 1-14, and wherein to determine the one or more second execution constraints comprises to determine a resource requirement of the second network application based on the one or more second execution constraints; and to determine whether the second network request is delayable comprises to determine whether the resource requirement is less than a threshold resource requirement.

Example 16 includes the subject matter of any of Examples 1-15, and wherein the resource requirement comprises a processor requirement of the second network application, and the threshold resource requirement comprises a threshold processor requirement.

Example 17 includes the subject matter of any of Examples 1-16, and wherein to determine the one or more first execution constraints comprises to determine the one or more first execution constraints from an execution constraints database of the mobile computing device.

Example 18 includes the subject matter of any of Examples 1-17, and wherein the first execution constraints are provided by the first network application to the execution constraints database prior to receipt of the first network request.

Example 19 includes a method for scheduling applications, the method comprising receiving, by a mobile computing device, a first network request from a first network application of the mobile computing device; determining, by the mobile computing device, one or more first execution constraints for the first network application; determining, by the mobile computing device, whether the first network request is delayable based on the one or more first execution constraints; scheduling, by the mobile computing device, the first network request for delayed execution in response to determining the first network request is delayable; receiving, by the mobile computing device, a second network request from a second network application of the mobile computing device; and executing, by the mobile computing device, the first network request and the second network request concurrently in response to receiving the second network request.

Example 20 includes the subject matter of Example 19, and wherein determining the one or more first execution constraints comprises determining an urgency level of the first network application based on the one or more first execution constraints; and determining whether the first network request is delayable comprises determining whether the urgency level is less than a threshold urgency level.

Example 21 includes the subject matter of any of Examples 19 and 20, and wherein determining the urgency level comprises determining a priority of the first network application based on the one or more first execution constraints; and determining whether the urgency level is less than the threshold urgency level comprises determining whether the priority is less than a threshold priority.

Example 22 includes the subject matter of any of Examples 19-21, and wherein determining the urgency level comprises determining an application class of the first network application based on the one or more first execution constraints; and determining whether the urgency level is less than the threshold urgency level comprises determining whether the application class belongs to a predefined set of urgent application classes.

Example 23 includes the subject matter of any of Examples 19-22, and wherein determining the urgency level comprises determining an acceptable latency of the first network application based on the one or more first execution constraints; and determining whether the urgency level is less than the threshold urgency level comprises determining whether the acceptable latency exceeds a threshold latency.

Example 24 includes the subject matter of any of Examples 19-23, and wherein scheduling the first network request for delayed execution comprises setting a delay timer based on the acceptable latency of the first network application; wherein the method further comprises determining, by the mobile computing device, whether the delay timer has elapsed; and executing the first network request and the second network request comprises executing the first network request and the second network request concurrently in response to determining the delay timer has elapsed.

Example 25 includes the subject matter of any of Examples 19-24, and wherein determining the one or more first execution constraints comprises determining a resource requirement of the first network application based on the one or more first execution constraints; and determining whether the first network request is delayable comprises determining whether the resource requirement is less than a threshold resource requirement.

Example 26 includes the subject matter of any of Examples 19-25, and wherein determining the resource requirement comprises determining a processor requirement of the first network application based on the one or more first execution constraints; and determining whether the resource requirement is less than the threshold resource requirement comprises determining whether the processor requirement is less than a threshold processor requirement.

Example 27 includes the subject matter of any of Examples 19-26, and further including determining, by the mobile computing device, one or more second execution constraints for the second network application; determining, by the mobile computing device, whether the second network request is delayable based on the one or more second execution constraints; scheduling, by the mobile computing device, the second network request for delayed execution in response to determining the second network request is delayable; and determining, by the mobile computing device in response to scheduling the second network request, whether more than a threshold number of network requests have been scheduled for delayed execution; wherein executing the first network request and the second network request comprises executing the first network request and the second network request in response to determining that more than the threshold number of network requests have been scheduled for delayed execution.

Example 28 includes the subject matter of any of Examples 19-27, and further including determining, by the mobile computing device, one or more second execution constraints for the second network application; determining, by the mobile computing device, whether the second network request is delayable based on the one or more second execution constraints; and scheduling, by the mobile computing device, the second network request for immediate execution in response to determining the second network request is not delayable; wherein executing the first network request and the second network request comprises executing the first network request and the second network request concurrently in response to scheduling the second network request for immediate execution.

Example 29 includes the subject matter of any of Examples 19-28, and wherein determining the one or more second execution constraints comprises determining an urgency level of the second network application based on the one or more second execution constraints; and determining whether the second network request is delayable comprises determining whether the urgency level is less than a threshold urgency level.

Example 30 includes the subject matter of any of Examples 19-29, and wherein determining the urgency level comprises determining a priority of the second network application based on the one or more second execution constraints; and determining whether the urgency level is less than the threshold urgency level comprises determining whether the priority is less than a threshold priority.

Example 31 includes the subject matter of any of Examples 19-30, and wherein determining the urgency level comprises determining an application class of the second network application based on the one or more second execution constraints; and determining whether the urgency level is less than the threshold urgency level comprises determining whether the application class belongs to a predefined set of urgent application classes.

Example 32 includes the subject matter of any of Examples 19-31, and wherein determining the urgency level comprises determining an acceptable latency of the second network application based on the one or more second execution constraints; and determining whether the urgency level is less than the threshold urgency level comprises determining whether the acceptable latency exceeds a threshold latency.

Example 33 includes the subject matter of any of Examples 19-32, and wherein determining the one or more second execution constraints comprises determining a resource requirement of the second network application based on the one or more second execution constraints; and determining whether the second network request is delayable comprises determining whether the resource requirement is less than a threshold resource requirement.

Example 34 includes the subject matter of any of Examples 19-33, and wherein determining the resource requirement comprises determining a processor requirement of the second network application based on the one or more second execution constraints; and determining whether the resource requirement is less than the threshold resource requirement comprises determining whether the processor requirement is less than a threshold processor requirement.

Example 35 includes the subject matter of any of Examples 19-34, and wherein determining the one or more first execution constraint comprises determining the one or more first execution constraint from an execution constraints database of the mobile computing device.

Example 36 includes the subject matter of any of Examples 19-35, and wherein the first execution constraints are provided by the first network application to the execution constraints database prior to receiving the first network request.

Example 37 includes a computing device comprising a processor; and a memory having stored therein a plurality of instructions that when executed by the processor cause the computing device to perform the method of any of Examples 19-36.

Example 38 includes one or more machine-readable storage media comprising a plurality of instructions stored thereon that in response to being executed result in a computing device performing the method of any of Examples 19-36.

Example 39 includes a computing device comprising means for performing the method of any of Examples 19-36.

The invention claimed is:

1. A mobile computing device for scheduling applications, the mobile computing device comprising:
an application scheduler module to:
receive one or more first execution constraints from a first network application of the mobile computing device;
receive a first network request from the first network application after receipt of the one or more first execution constraints;
determine the one or more first execution constraints for the first network application in response to receipt of the first network request;
determine whether the first network request is delayable based on the one or more first execution constraints, wherein the one or more first execution constraints comprises a resources execution constraint and an urgency execution constraint, wherein the resources execution constraint is indicative of one or more resources of the mobile computing device required to complete the first network request and wherein the urgency constraint is indicative of tolerance of the first network application to time delay, wherein to determine whether the first network request is delayable based on the one or more first execution constraints comprises to:
determine whether the resources execution constraint is less than a threshold resource requirement;
determine whether the urgency constraint is less than a threshold urgency requirement in response to a determination that the resources execution constraint is less than the threshold resource requirement;
determine that the first network request is delayable in response to a determination that the urgency constraint is less than the threshold urgency requirement; and
determine that the first network request is not delayable in response to a determination that the resources execution constraint is not less than the threshold resource requirement or a determination that the urgency constraint is not less than the threshold urgency requirement;
schedule the first network request for delayed execution in response to a determination that the first network request is delayable;
receive a second network request from a second network application of the mobile computing device; and
schedule the first network request and the second network request for concurrent execution in response to receipt of the second network request.

2. The mobile computing device of claim 1, wherein:
to determine the one or more first execution constraints comprises to determine an urgency level of the first network application based on the one or more first execution constraints; and
to determine whether the first network request is delayable comprises to determine whether the urgency level is less than a threshold urgency level.

3. The mobile computing device of claim 2, wherein the urgency level comprises a priority of the first network application, and the threshold urgency level comprises a threshold priority.

4. The mobile computing device of claim 2, wherein:
the urgency level comprises an application class of the first network application; and
to determine whether the urgency level is less than the threshold urgency level comprises to determine whether the application class belongs to a predefined set of urgent application classes.

5. The mobile computing device of claim 2, wherein:
the urgency level comprises an acceptable latency of the first network application; and
to determine whether the urgency level is less than the threshold urgency level comprises to determine whether the acceptable latency exceeds a threshold latency.

6. The mobile computing device of claim 5, wherein to schedule the first network request for delayed execution comprises to set a delay timer based on the acceptable latency of the first network application;
wherein the application scheduler module is further to determine whether the delay timer has elapsed; and
wherein to execute the first network request and the second network request comprises to execute the first network request and the second network request concurrently in response to a determination that the delay timer has elapsed.

7. The mobile computing device of claim 1, wherein the application scheduler module is further to:
determine one or more second execution constraints for the second network application;
determine whether the second network request is delayable based on the one or more second execution constraints;
schedule the second network request for delayed execution in response to a determination the second network request is delayable; and
determine, in response to a scheduling of the second network request, whether more than a threshold number of network requests have been scheduled for delayed execution;
wherein to execute the first network request and the second network request comprises to execute the first network request and the second network request in response to a determination that more than the threshold number of network requests have been scheduled for delayed execution.

8. The mobile computing device of claim 1, wherein the application scheduler module is further to:
determine one or more second execution constraints for the second network application;
determine whether the second network request is delayable based on the one or more second execution constraints; and
schedule the second network request for immediate execution in response to a determination that the second network request is not delayable;
wherein to execute the first network request and the second network request comprises to execute the first network request and the second network request concurrently in response to a scheduling of the second network request for immediate execution.

9. The mobile computing device of claim 8, wherein:
to determine the one or more second execution constraints comprises to determine an urgency level of the second network application based on the one or more second execution constraints; and
to determine whether the second network request is delayable comprises to determine whether the urgency level is less than a threshold urgency level.

10. The mobile computing device of claim 9, wherein:
the urgency level comprises an acceptable latency of the second network application; and
to determine whether the urgency level is less than the threshold urgency level comprises to determine whether the acceptable latency exceeds a threshold latency.

11. The mobile computing device of claim 1, wherein to determine the one or more first execution constraints comprises to determine the one or more first execution constraints from an execution constraints database of the mobile computing device, wherein the first execution constraints are provided by the first network application to the execution constraints database prior to receipt of the first network request.

12. A method for scheduling applications, the method comprising:
receiving, by a mobile computing device, one or more first execution constraints from a first network application of the mobile computing device;
receiving, by the mobile computing device, a first network request from the first network application after receiving the one or more first execution constraints;
determining, by the mobile computing device, the one or more first execution constraints for the first network application in response to receiving the first network request;
determining, by the mobile computing device, whether the first network request is delayable based on the one or more first execution constraints, wherein the one or more first execution constraints comprises a resources execution constraint and an urgency execution constraint, wherein the resources execution constraint is indicative of one or more resources of the mobile computing device required to complete the first network request and wherein the urgency constraint is indicative of tolerance of the first network application to time delay, wherein determining whether the first network request is delayable based on the one or more first execution constraints comprises:
determining whether the resources execution constraint is less than a threshold resource requirement;
determining whether the urgency constraint is less than a threshold urgency requirement in response to determining that the resources execution constraint is less than the threshold resource requirement;
determining that the first network request is delayable in response to determining that the urgency constraint is less than the threshold urgency requirement; and
determining that the first network request is not delayable in response to determining that the resources execution constraint is not less than the threshold resource requirement or determining that the urgency constraint is not less than the threshold urgency requirement;
scheduling, by the mobile computing device, the first network request for delayed execution in response to determining the first network request is delayable;

receiving, by the mobile computing device, a second network request from a second network application of the mobile computing device; and executing, by the mobile computing device, the first network request and the second network request concurrently in response to receiving the second network request.

13. The method of claim 12, wherein:

determining the one or more first execution constraints comprises determining an acceptable latency of the first network application based on the one or more first execution constraints; and determining whether the first network request is delayable comprises determining whether the acceptable latency exceeds a threshold latency.

14. The method of claim 12, further comprising:

determining, by the mobile computing device, one or more second execution constraints for the second network application;

determining, by the mobile computing device, whether the second network request is delayable based on the one or more second execution constraints;

scheduling, by the mobile computing device, the second network request for delayed execution in response to determining the second network request is delayable; and determining, by the mobile computing device in response to scheduling the second network request, whether more than a threshold number of network requests have been scheduled for delayed execution;

wherein executing the first network request and the second network request comprises executing the first network request and the second network request in response to determining that more than the threshold number of network requests have been scheduled for delayed execution.

15. The method of claim 12, further comprising:

determining, by the mobile computing device, one or more second execution constraints for the second network application;

determining, by the mobile computing device, whether the second network request is delayable based on the one or more second execution constraints; and scheduling, by the mobile computing device, the second network request for immediate execution in response to determining the second network request is not delayable;

wherein executing the first network request and the second network request comprises executing the first network request and the second network request concurrently in response to scheduling the second network request for immediate execution.

16. The method of claim 15, wherein:

determining the one or more second execution constraints comprises determining an urgency level of the second network application based on the one or more second execution constraints; and determining whether the second network request is delayable comprises determining whether the urgency level is less than a threshold urgency level.

17. One or more non-transitory, computer-readable storage media comprising a plurality of instructions that in response to being executed cause a mobile computing device to:

receive one or more first execution constraints from a first network application of the mobile computing device;

receive a first network request from the first network application after receiving the one or more first execution constraints;

determine the one or more first execution constraints for the first network application in response to receiving the first network request;

determine whether the first network request is delayable based on the one or more first execution constraints, wherein the one or more first execution constraints comprises a resources execution constraint and an urgency execution constraint, wherein the resources execution constraint is indicative of one or more resources of the mobile computing device required to complete the first network request and wherein the urgency constraint is indicative of tolerance of the first network application to time delay, wherein to determine whether the first network request is delayable based on the one or more first execution constraints comprises to:

determine whether the resources execution constraint is less than a threshold resource requirement;

determine whether the urgency constraint is less than a threshold urgency requirement in response to determining that the resources execution constraint is less than the threshold resource requirement;

determine that the first network request is delayable in response to determining that the urgency constraint is less than the threshold urgency requirement; and determine that the first network request is not delayable in response to determining that the resources execution constraint is not less than the threshold resource requirement or determining that the urgency constraint is not less than the threshold urgency requirement;

schedule the first network request for delayed execution in response to determining the first network request is delayable;

receive a second network request from a second network application of the mobile computing device; and execute the first network request and the second network request concurrently in response to receiving the second network request.

18. The one or more non-transitory, computer-readable storage media of claim 17, wherein:

to determine the one or more first execution constraints comprises to determine an acceptable latency of the first network application based on the one or more first execution constraints; and to determine whether the first network request is delayable comprises to determine whether the acceptable latency exceeds a threshold latency.

19. The one or more non-transitory, computer-readable storage media of claim 17, further comprising a plurality of instructions that in response to being executed cause the mobile computing device to:

determine one or more second execution constraints for the second network application;

determine whether the second network request is delayable based on the one or more second execution constraints;

schedule the second network request for delayed execution in response to determining the second network request is delayable; and determine, in response to scheduling the second network request, whether more than a threshold number of network requests have been scheduled for delayed execution;

wherein to execute the first network request and the second network request comprises to execute the first network request and the second network request in response to determining that more than the threshold number of network requests have been scheduled for delayed execution.

20. The one or more non-transitory, computer-readable storage media of claim 17, further comprising a plurality of instructions that in response to being executed cause the mobile computing device to:
   determine one or more second execution constraints for the second network application;
   determine whether the second network request is delayable based on the one or more second execution constraints; and
   schedule the second network request for immediate execution in response to determining the second network request is not delayable;
   wherein to execute the first network request and the second network request comprises to execute the first network request and the second network request concurrently in response to scheduling the second network request for immediate execution.

21. The one or more non-transitory, computer-readable storage media of claim 20, wherein:
   to determine the one or more second execution constraints comprises to determine an urgency level of the second network application based on the one or more second execution constraints; and
   to determine whether the second network request is delayable comprises to determine whether the urgency level is less than a threshold urgency level.

22. The mobile computing device of claim 1, wherein:
   the resources execution constraint comprises a processor constraint; and
   the urgency execution constraint comprises an application class, an acceptable latency, or a priority of the first network application.

* * * * *